Sept. 27, 1932.  F. M. BRAY  1,879,057
AUTOMOBILE DIRECTION SIGNAL
Filed April 5, 1930   2 Sheets-Sheet 1
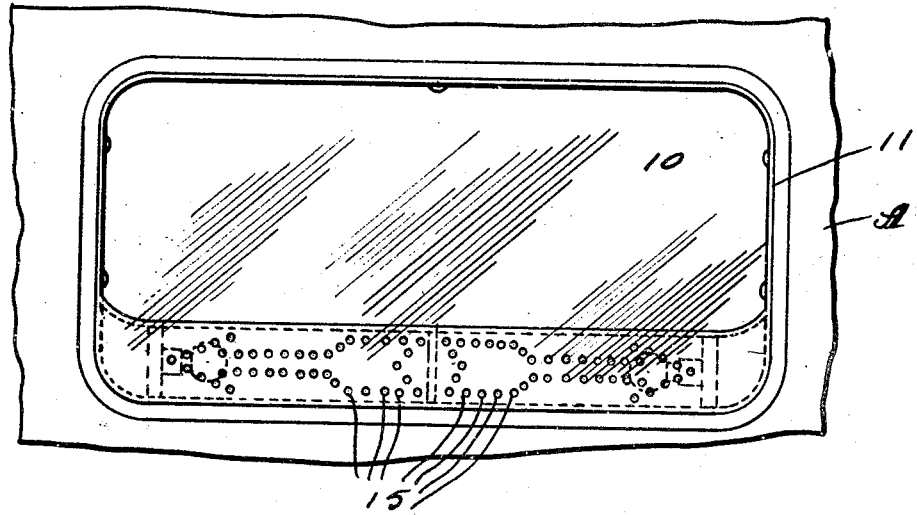
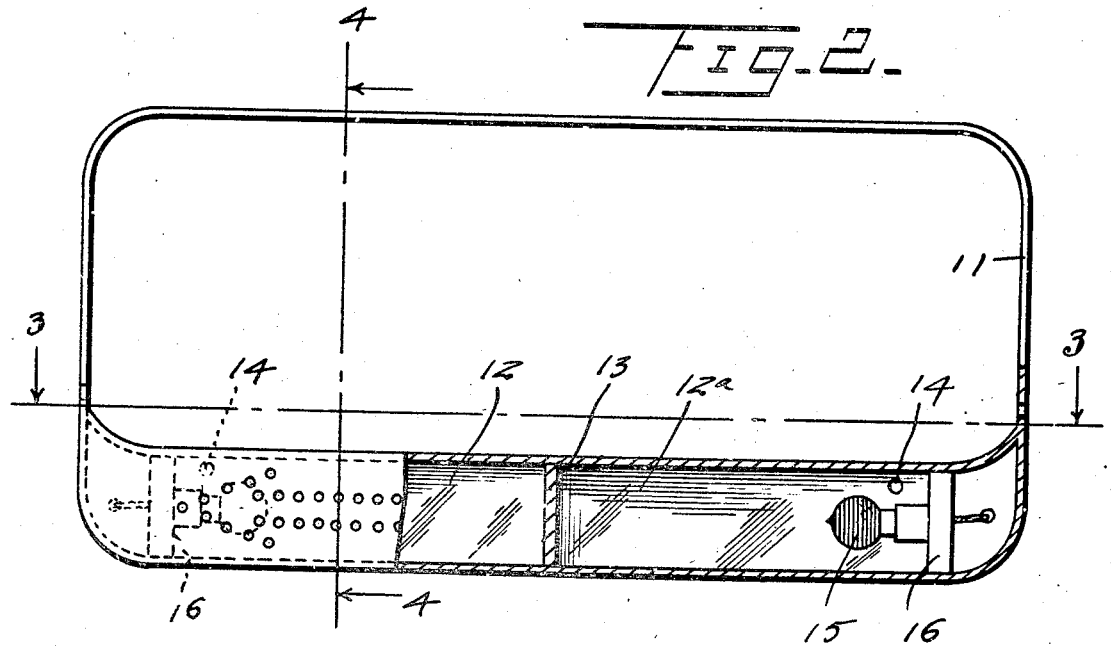
Inventor
F. M. Bray
By Watson E. Coleman
Attorney Sept. 27, 1932. F. M. BRAY 1,879,057
AUTOMOBILE DIRECTION SIGNAL
Filed April 5, 1930 2 Sheets-Sheet 2
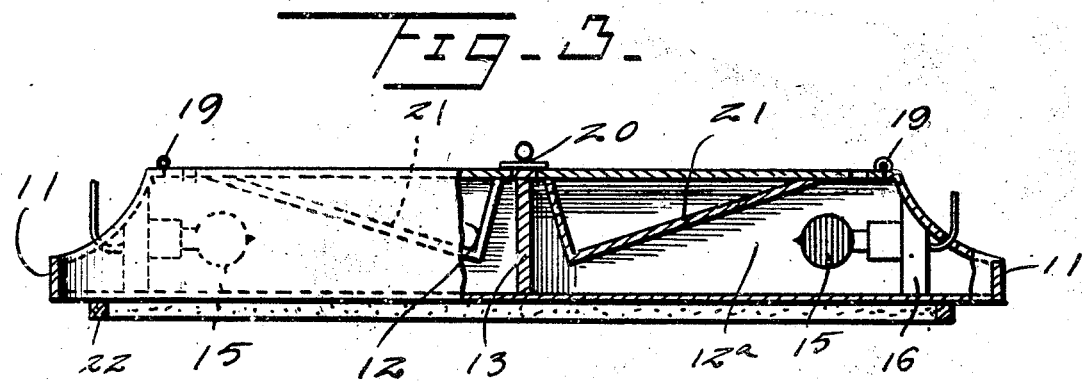
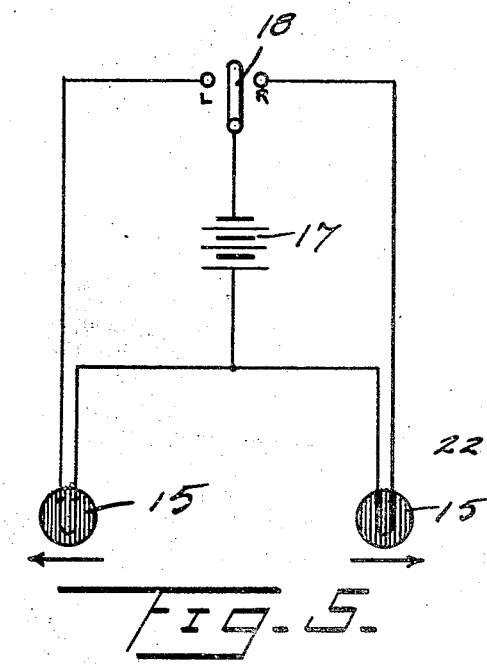
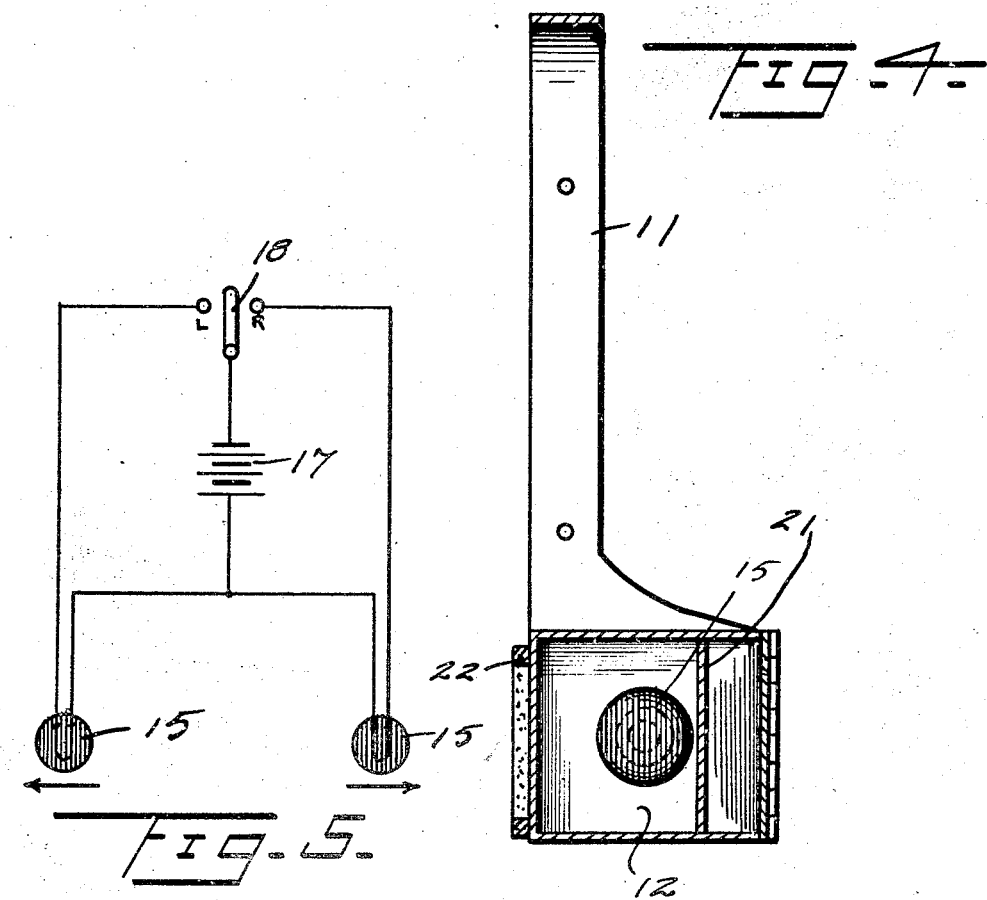

Patented Sept. 27, 1932

1,879,057

UNITED STATES PATENT OFFICE

FREEMAN M. BRAY, OF COLUMBUS, KANSAS

AUTOMOBILE DIRECTION SIGNAL

Application filed April 5, 1930. Serial No. 441,958.

This invention relates to automobile signals and particularly to rear direction signals.

The general object of this invention is to provide a direction signal adapted to be placed in the rear window of an automobile and having electric lamps disposed in compartments within the frame of the device, the rear wall of the compartments being cut away to provide indicia illuminated when the lamps are energized to indicate in which direction the automobile is to turn.

A further object is to provide a device of this character which may be readily inserted in the rear window opening of the automobile or car, which is readily observable to the car behind and which is readily controlled.

Other objects will appear in the course of the following description.

My invention is illustrated in the accompanying drawings, wherein:—

Figure 1 is a rear elevation of a portion of the rear end of the car and showing my window with the signalling devices therein;

Figure 2 is a fragmentary vertical sectional view through the window frame and the signal lamp carrying compartments;

Figure 3 is a section on the line 3—3 of Figure 2;

Figure 4 is an enlarged section on the line 4—4 of Figure 2;

Figure 5 is a diagrammatic section of the means for energizing the lamps.

Referring to these drawings, A designates the rear of an automobile body having therein the usual rear window 10. Disposed within the casing of the rear window is a frame 11 which may be of any suitable construction and which is designed to be held in place in any desired manner. This frame may be flanged or channel-shaped in cross section, may be transversely flat or otherwise formed. The lower portion of the frame is formed to provide two compartments 12 and 12a separated by a transverse partition 13. The front wall of each of these compartments is provided with the perforation 14. The rear wall of each compartment is formed with a plurality of perforations 15 together defining any direction indicating mark, as for instance, an arrow, these arrows or other indicating marks extending in opposite directions toward the right or toward the left.

As illustrated, the arrow forming the rear wall of the compartment 12a is extended toward the right while the arrow forming the rear wall of the other compartment 12 extends toward the left. Disposed in each of these compartments is an electric bulb 15 mounted in a suitable support 16 carrying the ordinary or usual socket. These lamps are connected in circuit with a battery 17 and with a switch 18 as illustrated in Figure 5. This switch might be a dash board switch or mounted upon the wheel of the car or in any other suitable position and I do not wish to be limited to the particular circuit shown diagrammatically in Figure 5.

The front walls of the compartments 12 and 12a as shown in Fig. 3 are preferably hinged as at 19 and a latch 20 is used to hold these front walls or doors of these compartments closed. A suitable reflector 21 is attached to each of these front walls. Each of these reflectors is preferably inclined as shown in Figure 3 rearward from the outer end of the rear wall toward the front wall. This is so that the light will be equalized throughout the compartment. Preferably a felt strip 22 will be disposed upon the outer face of the rear wall of the signal so as to bear against the glass pane 10 and prevent any light from shining out around the joint between the rear wall of the compartments and the pane of glass.

In making a left turn, the driver operates the switch 18 or pushes a button located on the steering wheel or turns gear-shift knob a quarter turn to the left and the red bulb in the left compartment will be energized and the arrow formed by the light issuing from the perforations 15 will be illuminated. In making a right turn, the proper button may be pressed on the steering wheel or the gear shift knob may be given a quarter turn to the right or any other desired switch be used to energize the electric light bulb in the compartment 12 and then the arrow indicated on the rear wall of this compartment will be illuminated. The apertures 14 are to permit the driver to see that the electric lamps within the compartments are working properly.

It will be seen that this device is very simple, that it may be readily installed and particularly that it is very clearly observable by the driver of a rear car because the signal is disposed approximately on the level with his eyes and can be seen even though the two cars are very close to one another which is not the case where the signal is disposed low down on a level with the lower portion of the body or below it.

Furthermore by using the window to support these compartments, a large space may be utilized and a signal indication made, therefore, of relatively large size so that it may be plainly observable whereas where the signalling device is disposed in the lower part of the body or beneath it, the signalling device must be relatively small. It is for this reason that most of the signaling devices in use today merely indicate that the car is going to stop and not that it is going to the right or to the left.

I do not wish to be limited to the particular frame for the window nor to the particular means for attaching this frame to the body nor supporting glass within this frame.

I claim:—

A signaling device for automobiles comprising a frame adapted to be inserted and fit within and having the same size and shape as a rear window opening of an automobile, a portion of the frame being formed to provide transversely extending compartments, electric lamps in said compartments, the rear wall of each compartment being formed to provide a signaling symbol through which the light from the lamps may be seen when the lamps are energized.

In testimony whereof I hereunto affix my signature.

FREEMAN M. BRAY.